No. 628,150. Patented July 4, 1899.
C. TELLIER.
MANUFACTURE OF ICE AND PRODUCTION OF COLD, &c.
(Application filed Apr. 23, 1896.)
(No Model.) 3 Sheets—Sheet 1.
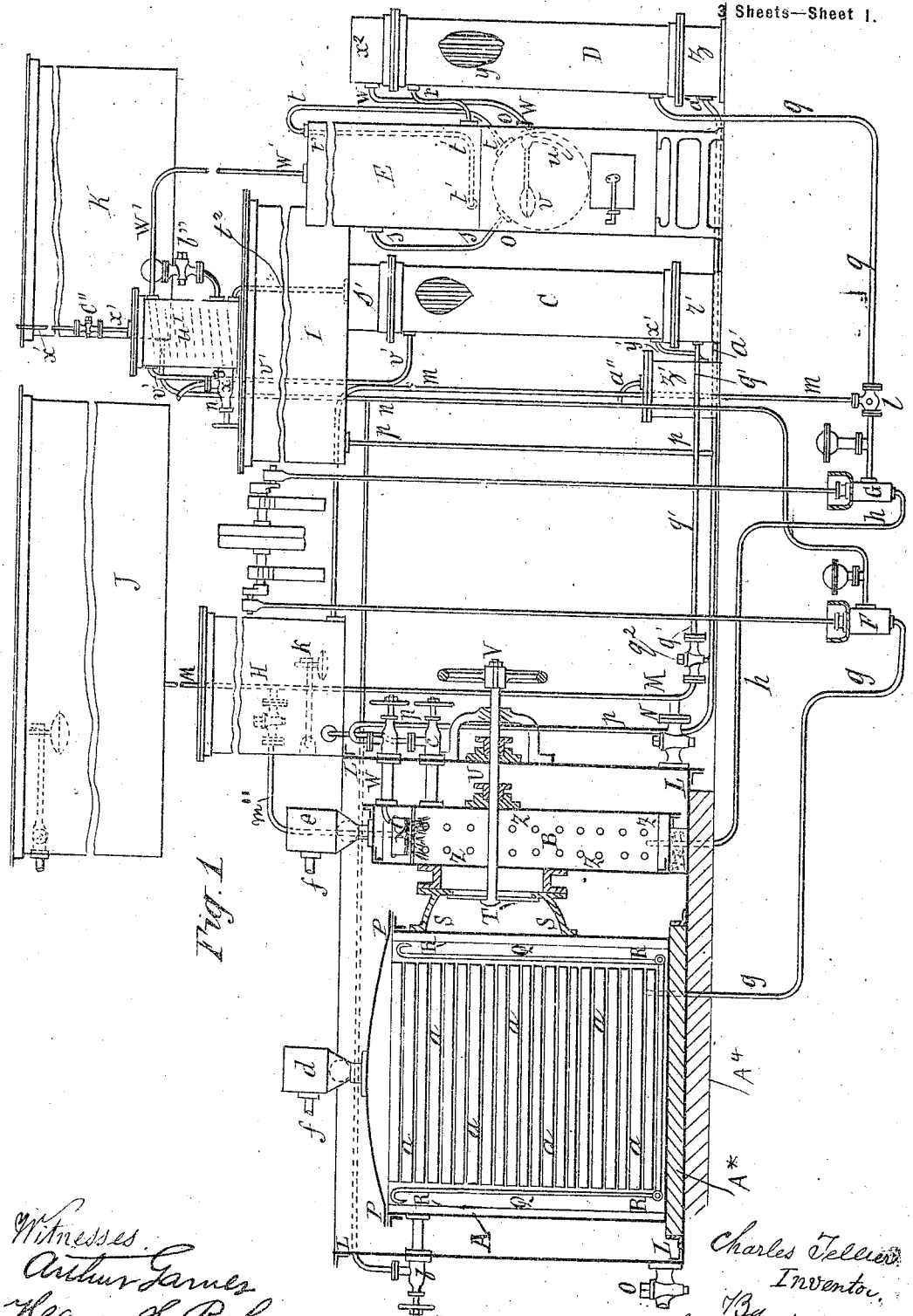
Witnesses
Arthur Garnes
Ham S Rohm
Charles Tellier
Inventor,
By John J. Halsted & Son
his attorneys

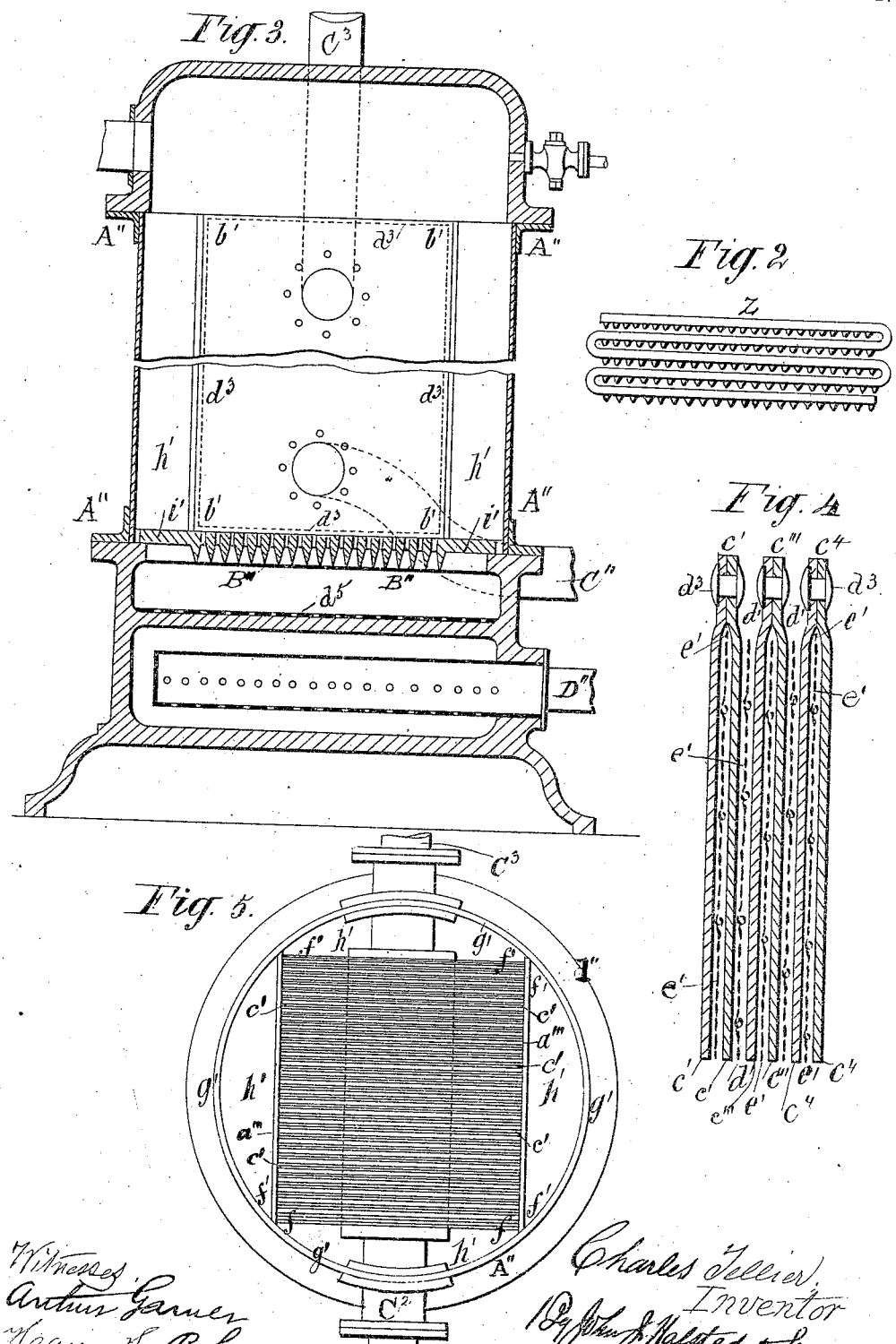

No. 628,150. Patented July 4, 1899.
C. TELLIER.
MANUFACTURE OF ICE AND PRODUCTION OF COLD, &c.
(Application filed Apr. 23, 1896.)
(No Model.) 3 Sheets—Sheet 3.
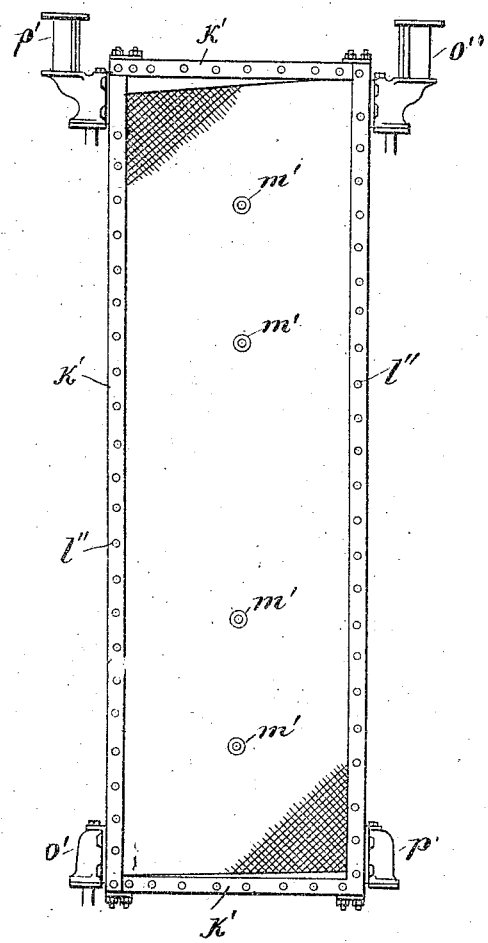
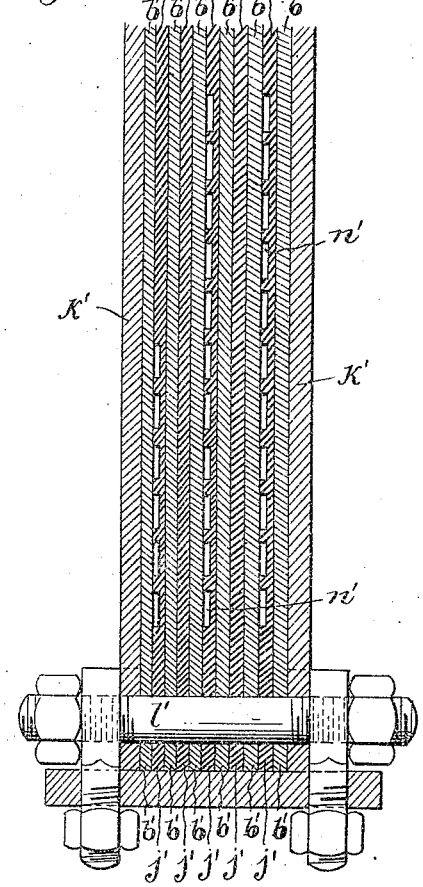
Witnesses
W. E. Bowen
N. R. Parkins.
Inventor
Charles Tellier.
By John J. Halsted & Son
His Attorney

UNITED STATES PATENT OFFICE.

CHARLES TELLIER, OF PARIS, FRANCE, ASSIGNOR TO THE COMPAGNIE-GÉNÉRALE DES NOUVELLES INVENTIONS CHARLES TELLIER, OF SAME PLACE.

MANUFACTURE OF ICE AND PRODUCTION OF COLD, &c.

SPECIFICATION forming part of Letters Patent No. 628,150, dated July 4, 1899.

Application filed April 23, 1896. Serial No. 588,836. (No model.)

*To all whom it may concern:*

Be it known that I, CHARLES TELLIER, a citizen of the Republic of France, residing at Paris, France, have invented new and useful Improvements in the Manufacture of Ice and in the Production of Cold and in Apparatus Therefor, of which the following is a specification.

This invention relates to improvements in the manufacture of ice and in the production of cold and in apparatus therefor in which a volatile liquid—such as water, ammoniacal solution, ethylamin, alcohol, or the like—is vaporized in a vacuum in the presence of an absorbent and with the help of a compression-pump.

I fill the apparatus with liquid which has been deprived of air in order to displace the air and subsequently withdraw the water or liquid so employed.

To avoid the entrance of air into the apparatus, which is a very important matter, I place all the parts of the same through which it is possible for air to enter on account of defects in the material or through rivets, bolts, &c., in a tank or cistern containing alkaline water or other thick fluid. The vacuum is produced by completely filling the apparatus with water or other suitable liquid freed from air and by then pumping the liquids from the apparatus by means of a pump which may advantageously be immersed in alkaline water or other liquid, as above described. A layer of oil or petroleum is poured on the water or liquid, so that the latter cannot absorb air.

The exchange of heat being of the greatest importance in my apparatus, I employ to bring about the same metallic plates united at their peripheries by means of rivets or bolts, so as to obtain a large surface in a small space and at a low cost and avoid the disadvantages appertaining to the use of tubes for this purpose.

In my improved apparatus I may dispense with floats, and in some cases, when found desirable, the pump-cylinders may be made of caoutchouc or india-rubber to prevent the entering of air through the stuffing-boxes.

To enable my invention to be fully understood, I will describe how it can be carried into practice by reference to the accompanying drawings, in which—

Figure 1 is an elevation, partly in section, of an apparatus for the manufacture of and production of cold according to my invention. Fig. 2 is an elevation of an arrangement of tubes employed in the absorbing-chamber. Fig. 3 is a vertical section of a heat-exchanger in which plates are employed instead of the tubes in the exchangers shown in Fig. 1. Fig. 4 is an edge view illustrating the construction and arrangement of the said plates shown in Fig. 3. Fig. 5 is a horizontal section of the exchanger shown in Fig. 3. Fig. 6 is an edge view showing another way of arranging the heat-exchanging plates. Fig. 7 is a side elevation of the same.

The apparatus shown in Fig. 1 consists principally of, first, a freezing vessel A; second, an absorbing apparatus or absorber B; third, exchangers C and D; fourth, a concentrator E; fifth, pumps F and G; sixth, receivers H, I, J, and K.

For the successful working of this apparatus it is necessary there shall be a perfect vacuum in the vessels A and B. For this purpose the said vessels and their accessories are located in a tank L, filled with water coming from the receiver or cistern J through the tube M and cock N. (See Fig. 1.) A cock O (see Fig. 1) allows of drawing off the water from the tank L, so as to uncover or cover the lid or cover P, as required. This cover rests upon india-rubber and is secured by bolts, clamps, or the like, and the pressure of the atmosphere assists in making a tight joint. In the freezing vessel A are located superposed trays *a a*, which can be removed by means of the hooked arms Q Q. These arms, as shown in Fig. 1, have their hooks at their upper ends to afford handles for lifting and at their lower ends are transversely connected, as shown, thus affording a ready means for removing the trays.

R R indicate an inner jacket of thin sheet-iron within the vessel A, and within which jacket the hooked arms Q Q and the superposed trays are placed.

The apparatus rests on an insulating-body

A*, (see Fig. 1,) run into a metal or wood base A⁴. Two conditions which will be found to be complied with in the different examples hereinafter described are necessary for a successful working, viz: first, an absolute vacuum; second, the absorption of the vapors produced.

The absorption takes place in the absorber B, connected to the freezing vessel A by a short pipe or tube S, provided with a valve T, manipulated by means of a rod U and a hand-wheel V. When the valve T is open, the vapor which is produced in A by the evaporation of the liquid becoming cooled and which fills the whole of the chamber A passes through the outlet-aperture S S and enters and fills the absorber B. It would remain there indefinitely and the operation would be stopped if suitable means were not employed for getting rid of it. Such means consist in the continuous introduction of a liquid capable of absorbing the vapors—for instance, sulfuric acid, a concentrated solution of chlorid of calcium, or a concentrated solution of soda or potash, &c. The absorbent enters through the tube W, which discharges it into a perforated trough X, which causes the absorbent to be distributed over two rows of superposed tubes Z Z of suitable length. The number of rows is proportionate to the effect to be produced. Each tube Z is coiled in a zigzag manner, as shown in Fig. 2, and is provided with saw-like teeth which facilitate the distribution of the liquid. This arrangement affords a very large absorption-surface adapted to take up the latent heat disengaged by the absorption of the vapors through the medium of the current of water coming from the receiver J and caused to pass into the tube M and thence through a lateral branch tube m'' to the trough X. Under the action of the continuous vaporization ice is formed in the trays a. To remove it, it is only necessary to uncover the apparatus and by means of the hooked arm Q to lift out the whole of the trays a.

The vacuum is produced as follows: The valve T being shut water is introduced into the apparatus through cock b and through any other cock or cocks, if needed, until it reaches beyond the valves d e, each located in a funnel which may be provided with a tube f for conducting the water away. This operation also takes place in vessel B. Pipe M connects receiver J with receiver H, pipes M m' connect J with vessel B, and pipe n connects with receiver K. When the air has been driven out by the water, the pumps F G are started and by means of the tubes g h draw off all the water from A and B, consequently producing a vacuum therein. The vacuum, however, would be imperfect with ordinary water. The water is therefore not drawn from the receiver J, but from the receivers K H, both containing boiled water protected from contact from the air by a layer of oil or petroleum. A float (see Fig. 1) serves in a well-known manner to arrest the flow of the liquid when it has reached a given level. By this means I produce a perfect vacuum, and the water which remains in the trays a, and which is to be converted into ice, is sterilized and filtered water, so that it gives rise to or forms a transparent ice.

It is impossible to thoroughly purify the absorber B from traces of the materials employed for the absorption and which dissolve in the water, serving to produce a vacuum. It is therefore economical to make repeated use of the water from the absorber. For this purpose a special receiver H is employed for storing the said water which is introduced therein through a two-way cock l and tube m.

I will now describe how the water is sterilized and the absorbent again brought to the proper strength for the process. These two operations requiring heat are carried out in a peculiar manner with the aid of the concentrating apparatus g. It consists of two parts—namely, the generator o of suitable construction, which may be replaced by a steam-heated receiver, and the washer E, placed above the said generator. As soon as the freezing apparatus is at work the absorbent is introduced into the trough X of the absorber B from the receiver I through the tube p and cock W. In order that absorber B may not become too quickly filled with the absorbent, the pump G causes the absorbent liquid to pass through the cock l, tube q, exchanger D, tube r, washer E, and tube a into the generator o, where the water absorbed is driven off by heat. To free the vapor given off from any particles of the absorbent which it may have carried along, I wash it in the liquid which is just going into the concentrator to reproduce the absorbent. For this purpose I cause it to leave the generator o through the tube t. This tube is bent over, as shown in Fig. 1, so as to enter the washing vessel E at its top, whence it extends downward to near its bottom and then extends therein horizontally. The vapor escaping from this pipe becomes washed in the liquid, which about half fills this washer E. This liquid retains the particles of absorbent carried along, and finally the vapor, as purified as possible, collects in the upper part of E, whence it can be taken as required. The absorbing liquid, which is concentrated in the generator O, escapes through a tube u, (shown in dotted lines,) the flow being regulated by the float v, which can be replaced by a pump with weighted valve. The generator O and its connections are heated by any ordinary means—as, for instance, through the agency of a furnace within which it is inclosed, the door of which is shown beneath the generator in Fig. 1. From the tube u the liquid passes through the tube w and cap or cover X² of the exchanger D down through the tubes constituting the said exchangers, (see the part y broken away,) and thence into the base z, where it leaves through the tube a', connected to the tube p, which conducts the liquid to its receiver I. A layer of petroleum prevents it from becoming affected by contact with the air.

Instead of employing the generator O for regenerating the absolvent I can utilize the heating action of steam from any suitable source.

The vapor produced by the concentration of the absorbent would become distributed in the second apparatus similar to B, and as by this time it would be water which would be caused to pass into the coil similar to $z$ the condensation of the disengaged vapor would take place in $u'$. I would observe that the washer E could be retained between the said two apparatus.

The action of the exchanger D is easily explained as follows: Coming from the absorber B is a cold liquid, which requires to be heated. On the other hand, in the generator O there is a hot liquid, which it is necessary to cool. By causing the two liquids to circulate in opposite directions in the exchanger D an exchange of heat is effected. Consequently the liquid that is conducted back into the absorber will be cooled, while that passing into the generator will be heated. The exchanger-tubes $y$ in the exchanger D can be replaced by flat chambers of two sheets of iron superposed and connected at their peripheries by rivets. One of these chambers is shown in front elevation at Fig. 3, marked with the letters $b'$ $b'$ $b'$ $b'$ and placed in the chamber A'' and supported by the grating B'. Fig. 4 shows a portion of three of these flat chambers, one at $c'$ $c'$ $c'$, the second at $c'''$ $c'''$ $c'''$, and the third at $c^4$ $c^4$ $c^4$. This figure shows at $d^3$ the rivets uniting the iron sheets in pairs. Wire-gauze can be inserted between the chambers and in the chambers. Fig. 4 illustrates this arrangement, showing the wire-gauze placed between the chambers, and $e'$ indicating that which may be placed within the chambers.

The liquid enters the chambers (see Fig. 3) through the tube C'' and passes out through the tube $C^3$, the circular form of the cylinder permitting these tubes to be connected therewith at any needed or desirable places. The part of the pipe D' which is within Fig. 3 is perforated, as shown, as is also the plate $d^5$, which is supported by and rests on a cross-bar or ledges above it. The horizontal section, Fig. 5, of the cylinder A' shows how a large number of these flat chambers can be placed in one cylinder. As shown in the horizontal section, the whole of these surfaces, each of which is shown at $c'$ $c'$, &c., form a parallelepiped $f'$ $f'$, while the casing $g'$ is cylindrical. The small scale on which these parts $c'$, &c., are shown (the sheets composing them being of only one millimeter in thickness) precludes the showing in cross-section in the drawings, such small scale reducing them to mere lines, as will be readily understood. The liquid the heat of which is to be exchanged, and which (see Fig. 3) arrives through the tube D'', would then, if there were no obstacles, enter the spaces $h'$ $h'$ and would pass through the same without being subjected to any exchange. In order to avoid this objection, I place wood or sheet-iron panels at $a'''$ $a'''$, &c., and fill all the spaces $h'$ with sand or other suitable material. To support this sand or other material, the grating B', Fig. 3, is made solid or full at $i'$ $i'$ beneath the spaces $h'$ $h'$. A layer of cement a few centimeters in thickness or other plastic materials deposited upon the full parts $i'$ $i'$ before the introduction of the sand insures perfect tightness. Consequently the liquid cannot pass through the spaces $h'$, and it is forced to travel between the plates.

Figs. 6 and 7 illustrate another method of forming flat chambers for effecting the exchange. Instead of being united at their periphery by rivets the sheets of iron $b'$ $b'$ are placed side by side, but separated by metal or other distance-pieces $j'$. Bolts, one of which is shown at $l'$ in Fig. 6 and the holes for which are shown at $l''$ in Fig. 7, are passed through the iron sheets $b'$ $b'$, &c., the distance-pieces $j'$, and the bars or covering angle-pieces $k'$, and they allow, by means of metal or other joint, of securing and locking together the whole apparatus. Fig. 7 is drawn to one-fifteenth the size of Fig. 6 the better to show the details.

A sufficient number of distance or tie bolts $m'$, Fig. 7, allows of supporting the apparatus, notwithstanding the pressure of several atmospheres which may be exerted from the interior.

Short tubes $o'$ $p'$ allow of the liquid circulating as required. These tubes are applied over the small openings (shown in Fig. 6) made at $n'$ $n'$ over the distance-pieces $j'$, so that the admission of the liquid into the flat chambers of the exchanger is insured.

Wire-gauze, fragments of which are shown in Fig. 7, can be placed, if desired, between the sheet-iron plates of each cell or chamber. The cells thus formed work in pairs—that is to say, one of the liquids rises in one of the cells while the other liquid descends in the other cell, whereby the exchange of temperature is effected. Thus in Fig. 7 one of the liquids rises through the lower tube $o'$ and passes through the upper tube $o''$, while the other liquid enters through the upper tube $p'$ and passes out through the lower tube $p''$.

The object of the wire-gauze is to force the liquids in circulation to be in constant movement in order to cause their incessently-agitated atoms to lick the surfaces, which greatly assists the calorific action.

The result of the cold and hot liquids traveling in opposite directions, as above stated, is an exchange of their temperatures, which is a result desired whether it be obtained by the tubular columns shown at C D or whether it be brought about by the arrangement of parts which I have just described and which is illustrated in Figs. 3, 4, 5, 6, and 7.

To effect the sterilization of the water and its separation from the gases dissolved in it, the water is conducted from tank J by the tube $g'$ (see Fig. 1) into the base $r'$ of the exchanger C, which is exactly similar to the exchanger D. The water rises in the exchanger C, reaches the cap or cover $s'$, whence it passes through a tube $t^2$ to the vessel $u'$, which it fills up to the overflow-pipe $v'$. In the vessel $u'$ is a coiled pipe, which continuously receives the vapor accumulated in E through the tube $w'$. This coil I employ to boil the water intended to be frozen, and from which by such boiling I eliminate the air. Now in order that the boiling may take place a temperature of 100° is required. It is therefore also necessary that the coil of vessel $u'$ shall condense the vapor which it receives to a pressure of one-half to one kilogram above that of the atmosphere, corresponding to about 112°. To this end the vapor does not escape freely from the coil. It is retained by a valve $x^3$, weighted to one-half to one kilogram, so as to obtain the desired pressure in the coil. The pressure of the one-half to one kilogram may be varied. The temperature of the water contained in $u'$ will therefore be maintained at 100° centigrade for a sufficient length of time for it to become sterilized and freed from air, which escapes with the vapor produced through $x'$. The water issues through the overflow-pipe $v'$, which passes downward and conducts it into the top of the exchanger C, after traversing which it reaches the bottom of the same, passes off at $x'$, and is conducted by the tube $y'$ to the bottom of the filter $z'$, (which may be a reversible filter,) and finally leaves through the tube $a''$. The pipe $n$ conducts it to the receiver K, where it remains until required for use. The cock $q^2$, Fig. 1, allows of regulating the flow.

The apparatus works with a quantity of heat equivalent to that produced in the freezing operation.

The air from the receivers being compressed by the water and protected by a layer of oil or an india-rubber cushion will furnish the required degree of pressure, as a monte-jus. A float will prevent the egress of the layer of oil.

The pumps sometimes allow air to enter by reason of the porosity of the metal of which they are made as well as through the imperfect stuffing-boxes. To obviate this objection, it is necessary to place them in tanks containing water or other liquid covering the stuffing-boxes. They can even be placed in the tank I; but as it is always necessary that they should be lower than the freezing vessel A and absorber B the tank must in this case be provided with two chambers or wells adapted to receive the said pumps.

By opening the cock $b''$ and closing that at $c''$ while the generator is heated the vapor fills the generator and sterilizes the contents.

In some cases it is required to produce cold-liquid currents. In such cases alcohol, water containing a salt in solution, an alkali, an ammoniacal solution, or the like may be used.

Having now particularly described and ascertained the nature of my said invention and in what manner the same is to be performed, I declare that what I claim is—

1. In an apparatus for producing cold by means of a vacuum, the combination with and within the exchangers, of metal plates and a wire-gauze interposed between the sheets forming the exchangers and serving to keep the liquids which are in circulation, constantly agitated, and to force them to lick the exchanging-surfaces formed by such sheets.

2. In an apparatus for producing cold by means of a vacuum, the combination of the freezing vessel, with the absorber, and exchangers with metal plates separated by wire-gauze interposed between the sheets forming the exchangers and serving to keep the liquids finely divided during circulation and forcing them to lick the exchanging-surfaces formed by such sheets.

3. In an apparatus for producing cold by means of a vacuum, the combination of the exchangers provided with metal plates and a wire-gauze interposed between the sheets forming the exchangers as set forth, with the filter $z'$, all substantially as described.

4. In an apparatus for producing cold by means of a vacuum, the combination of the exchangers provided with metal plates and a wire-gauze interposed between the sheets forming the exchangers as set forth, the furnace O, concentrator E, and still $u'$, all substantially as described.

5. In an apparatus for producing cold by means of a vacuum, the combination of the exchangers provided with metal plates and a wire-gauze interposed between the sheets forming the exchangers as set forth, with a circulating-pump and concentrator, all substantially as described.

6. In combination with the freezing vessel and with its superposed trays, and lifting-arms Q, Q, hooked at their upper ends, and transversely connected at their lower ends, substantially as and for the purposes set forth.

7. In combination with the freezing vessel, and with the trays and their lifting-arms within the vessel, the described pumps, heat-exchanger D, concentrator E, generator or furnace, vessel $u'$, heat-exchanger C, filter $z'$, and storage-tank K, all substantially as set forth.

CHARLES TELLIER.

Witnesses:
L. LEFEVRE,
L. DUPREZ.